United States Patent [19]

Flinchbaugh et al.

[11] 4,398,110

[45] Aug. 9, 1983

[54] HARMONIC ELECTRIC ACTUATOR

[75] Inventors: David E. Flinchbaugh, Orlando, Fla.; Raymond R. Hill, Danville, Va.; Robert Shaffer, Swissvale; Thomas R. Wagner, Monroeville, both of Pa.

[73] Assignee: Westinghouse Electric Corp., Pittsburgh, Pa.

[21] Appl. No.: 375,247

[22] Filed: May 5, 1982

[51] Int. Cl.³ .............................................. B25J 3/00
[52] U.S. Cl. ......................................... 310/83; 3/1.1; 3/12.3; 414/4; 414/732
[58] Field of Search .................. 3/1.1, 12.3, 12.5; 310/80, 82, 83, 67 R, 115, 118, 266; 414/4, 732, 735

[56] References Cited

U.S. PATENT DOCUMENTS

| | | | |
|---|---|---|---|
| 2,899,005 | 8/1959 | Speicher | 310/67 R |
| 3,043,448 | 7/1962 | Melton | 414/735 |
| 3,209,182 | 9/1965 | Spring | 310/83 |
| 3,311,766 | 3/1967 | Scott | 310/83 |
| 3,770,997 | 11/1973 | Presley | 310/82 |
| 3,790,002 | 2/1974 | Germond et al. | 414/735 |
| 3,849,668 | 11/1974 | Dane | 307/149 |
| 3,883,900 | 5/1975 | Jerard et al. | 3/1.1 |
| 3,987,498 | 10/1976 | Mason | 3/1.1 |
| 4,062,455 | 12/1977 | Flatau | 414/735 |
| 4,188,166 | 2/1980 | Moreau et al. | 414/735 |
| 4,227,092 | 10/1980 | Campagnuolo et al. | 310/75 D |

Primary Examiner—J. D. Miller
Assistant Examiner—D. L. Rebsch
Attorney, Agent, or Firm—L. A. DePaul

[57] ABSTRACT

The electric actuator comprises a deep cup harmonic drive gear train member with an electric motor, brake, tachometer, and resolver disposed therein. The arrangement and coupling of the components provides a high torque-to-weight ratio actuator that is capable of more than 360° rotation.

10 Claims, 10 Drawing Figures

HARMONIC ELECTRIC ACTUATOR

BACKGROUND OF THE INVENTION

This invention relates to electric actuators and more particularly to high torque-to-weight ratio electric actuators for use in robotic systems.

As is well known in the art, robotic systems can be used to reduce or eliminate manual operations in certain industrial operations. This reduction in manual operations may often result in significant productivity improvements in the operation. Moreover, in hazardous or limited access environments the use of robotic systems may not only be advantageous but may also be a necessity. For example, in the repair or maintenance of nuclear reactor power plants, it is important to be able to limit the time that working personnel are located in a radioactive environment so as to limit the working personnel's radiation exposure. Thus, the use of robotic systems in nuclear power plant maintenance can result in both improved productivity and in decreased radiation exposure.

In robotic arm systems, the elements which power the movements of the robotic arm may be located away from the arm joints (driving the joints by means of chains or belts) or the elements may be located at each joint. The use of actuators located at each joint decreases the compliance of the arm, but reduces the arm's load capability due to the added weight of the actuator on the arm. On the other hand, the use of actuators located remote from the joint reduces the weight of the arm, but increases compliance and accuracy of the arm's movement. It is therefore desirable that actuators located in the arms be both powerful and lightweight. Traditionally, such actuators have been hydraulic-type actuators because no electric actuator could match the torque-to-weight ratios of hydraulic actuators. Hydraulic systems, however, are more difficult to control, are not capable of continuous rotation (vane type), and require a large amoung of peripheral equipment (i.e. pumps and accumulators). Also, when used in environments where human access is limited, the possibility of contamination by the hydraulic fluid exists.

Therefore, what is needed is an electric actuator having a high torque-to-weight ratio and capable of being mounted in an arm of a robotic system.

SUMMARY OF THE INVENTION

The electric actuator comprises a deep cup harmonic drive gear train member with an electric motor, brake, tachometer, and resolver disposed therein. The arrangement and coupling of the components provides a high torque-to-weight ratio actuator that is capable of more than 360° rotation.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

In robotic systems it is important to be able to provide lightweight manipulators with high torque capabilities. The invention, described herein, provides an electric actuator with a high torque-to-weight characteristic for use in robotic arm systems.

Figure 1:
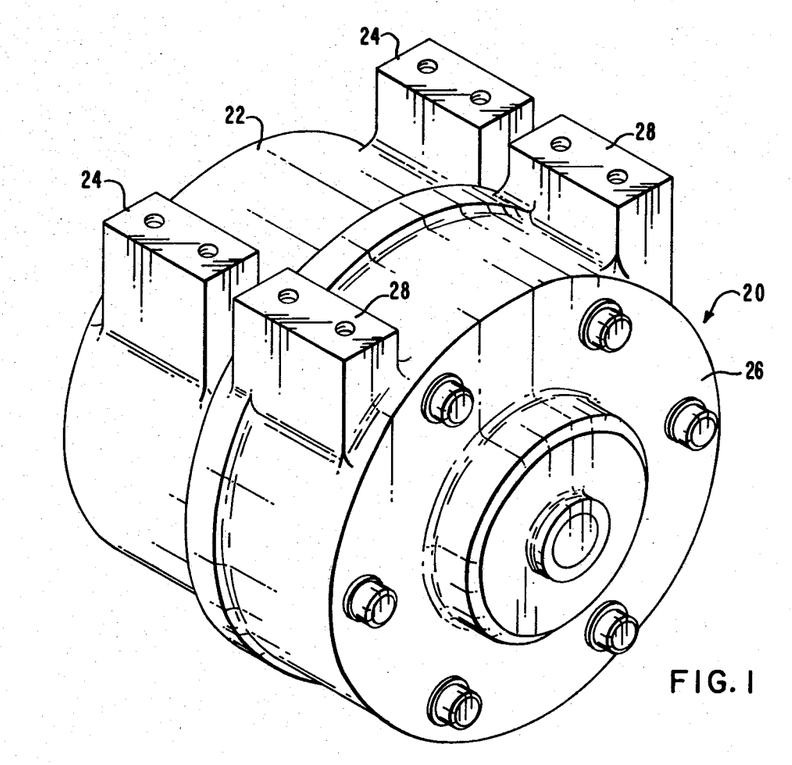
FIG. 1 is a view in perspective of the electric actuator.

Referring to FIG. 1, the electric actuator is referred to generally as 20 and comprises a first housing 22 with first attachment mechanisms 24 and a second housing 26 with second attachment mechanisms 28. Second housing 26 is capable of rotating relative to first housing 24 for establishing relative movement of a robotic system. For example, electric actuator 20 may be used in a joint of a robotic arm for moving one portion of the robotic arm relative to the other. In which case, first attachment mechanisms 24 and second attachment mechanisms 28 may be used to mount electric actuator 20 to the robotic arm.

Figure 2:
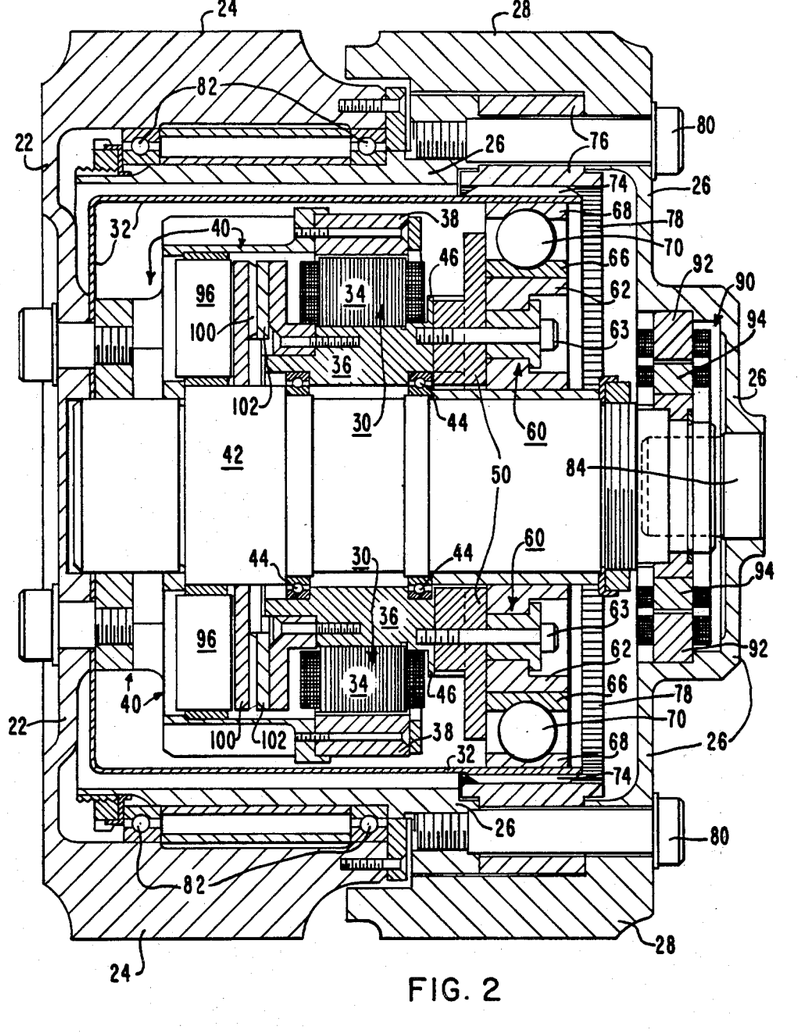
FIG. 2 is a cross-sectional view of the electric actuator.
Figure 3:
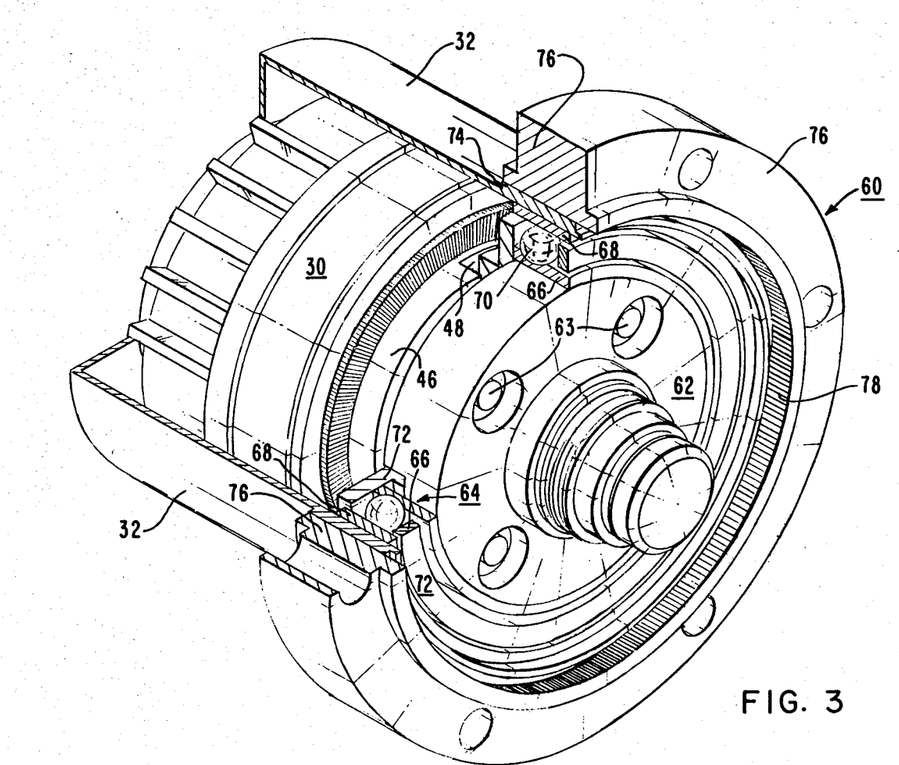
FIG. 3 is a partial cross-sectional view in perspective of the electric actuator.

Referring now to FIGS. 2 and 3, electric actuator 20 comprises a motor 30 which may be a 0.2 Hp samarium-cobalt rare-earth magnet, frameless DC torque motor and disposed in a deep cup harmonic drive member 32 that may be mounted in first housing 22. Motor 30 has a rotor winding 34 attached to rotor assembly 36 and a stator winding 38 disposed around rotor winding 34 and attached to stator assembly 40. Stator winding 38 may also comprise a samarium-cobalt rare-earth magnet for generating an electromotive force. Stator assembly 40 is mounted on stationary shaft 42 which is fixedly attached to first housing 22. Rotor assembly 36 is rotatably mounted on shaft 42 by means of first bearings 44 so as to provide a means by which rotor assembly can rotate around shaft 42 when motor 30 is operated in a conventional manner.

Referring now to FIGS. 2-5, rotor assembly 36 is formed to have a ring 46 with a plurality of first keyways 48 therein. A circular coupling 50 has a hole 52 in the center thereof for allowing coupling 50 to be disposed around shaft 42. Coupling 50 also has a plurality of first keys 54 on one side thereof formed to fit into and mate with first keyways 48 for attaching coupling 50 to ring 46 of rotor assembly 36. Coupling 50 also has a plurality of second keys 56 on the side opposite the side on which first keys 54 are disposed for providing a means to connect coupling 50 to another member. Coupling 50 is used to transmit torque between elements while allowing a slight radial misalignment relative to shaft 42.

Figure 4:
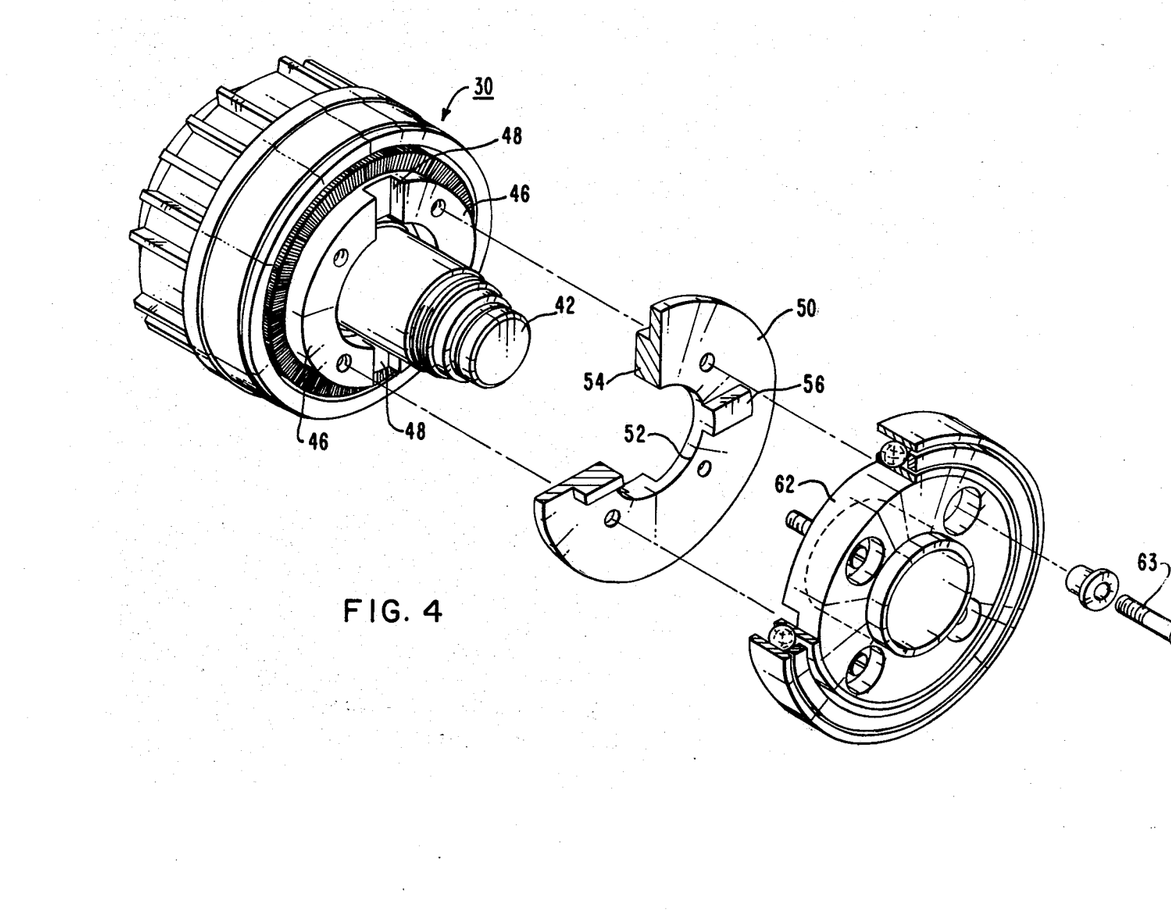
FIGS. 4 and 5 are exploded views of the coupling of the electric actuator.
Figure 5:
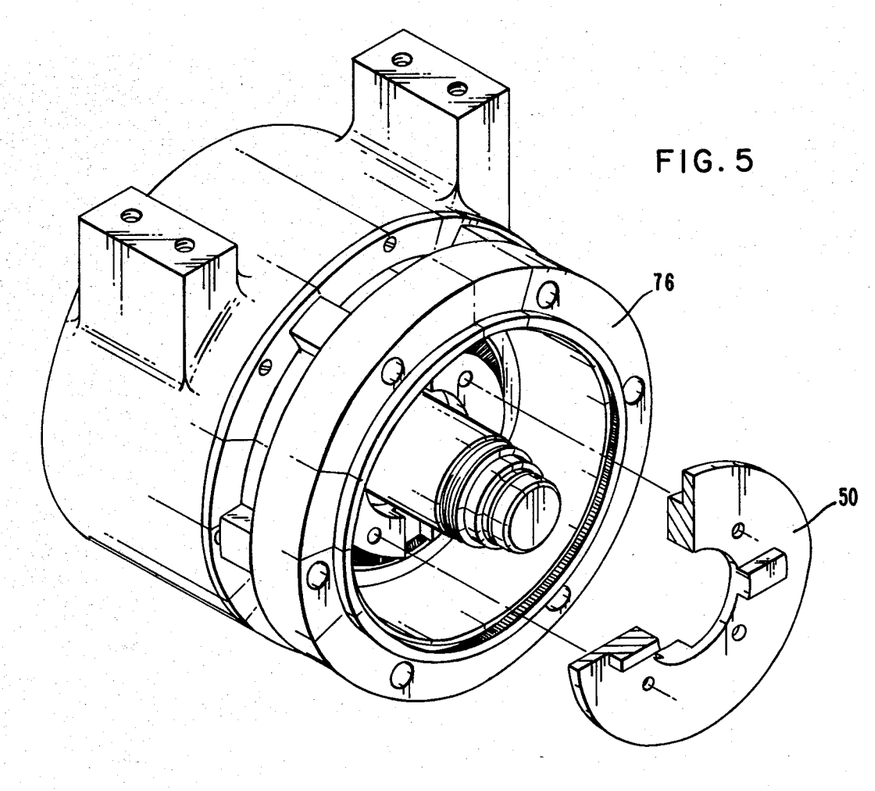

Referring now to FIGS. 2-7, a harmonic drive mechanism 60 is disposed on shaft 42 and attached to coupling 50 for transmitting rotary motion from motor 30 to second housing 26. Harmonic drive mechanism 60 comprises a first drive member 62 rotatably disposed on shaft 42 and attached to coupling 50 by means of second keys 56. In addition, a plurality of bolts 63 may be used to axially constrain first drive member 62, coupling 50, and ring 46 together as shown in FIG. 4. First drive member 62 is formed to have an outside diameter of an elliptical configuration for generating a drive wave as first drive member 62 is rotated around shaft 42 by rotor assembly 36. A flexible drive assembly 64 is disposed around drive member 62 and comprises a first flexible ring 66 and a second flexible ring 68 with a plurality of ball bearings 70 disposed therebetween and contained therein by side member 72. Flexible drive assembly 64 is arranged such that when first drive member 62 is rotated, the elliptical configuration causes first flexible ring 66 and second flexible ring 68 to be flexed thereby, transmitting the elliptical wave generated by first drive member 62.

Figure 6:
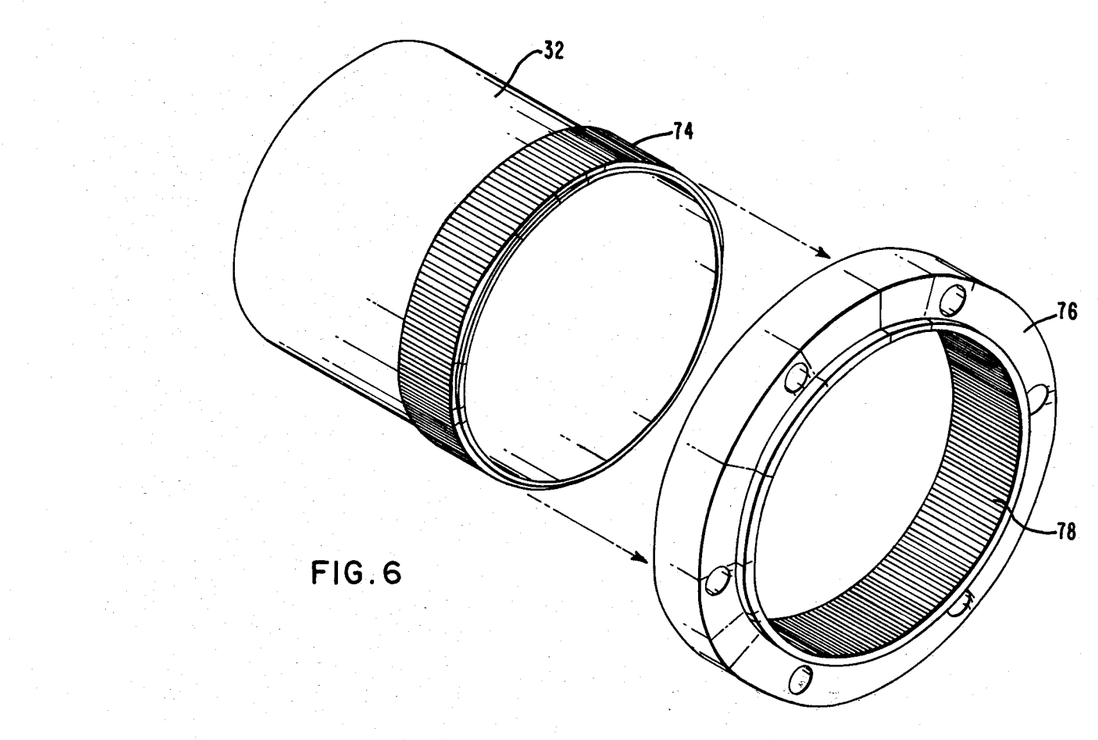
FIG. 6 is an exploded view of the deep cup harmonic drive mechanism and outer ring.
Figure 7:
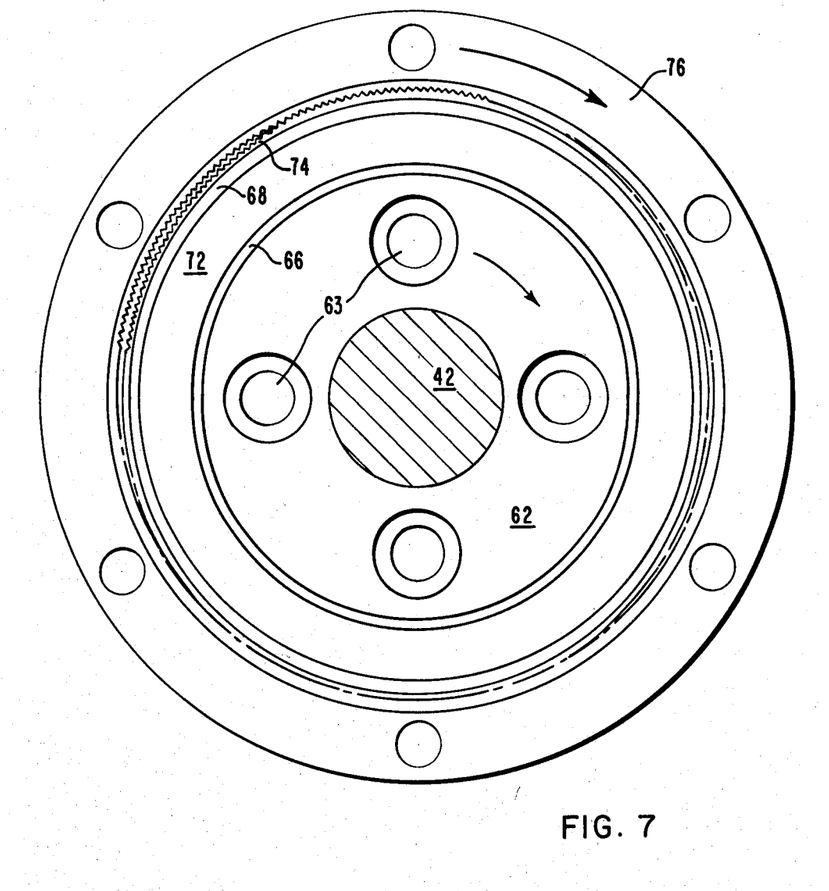
FIG. 7 is a schematic view of the movement of the harmonic drive.

Deep cup harmonic drive member 32 has a plurality of teeth 74 on the outside thereof near its open end and arranged to coincide with the location of second flexible ring 68. A rigid outer ring 76 is disposed around teeth 74 and has a set of teeth 78 arranged along the inside circumference thereof in a manner to mate with teeth 74. Teeth 78 are greater in number than teeth 74 so that teeth 78 and teeth 74 will only mesh at two radially opposed points along their circumference which move along the circumference as outer ring 76 rotates about deep cup harmonic drive member 32. Since first drive member 62 has an elliptical configuration, as first drive member 62 rotates, it causes first flexible ring 66 and second flexible ring 68 to flex outwardly along the longest radius of first drive member 62. The outward flexing of second flexible ring 68 causes teeth 74 of deep cup harmonic drive member 32 to also flex outwardly and into contact with teeth 78. Because teeth 74 and teeth 78 only mesh at two radially opposed points along their circumference and since the rotation of first drive member 62 causes the point of meshing to move along the circumference, this interaction causes outer ring 76 to rotate around deep cup harmonic drive member 32 in the same direction as first drive member 62 but at a slower angular speed. This mechanism thereby provides a means to transmit rotation from motor 30 to outer ring 76 at a reduced speed. Thus, low-speed, high-torque movement can be transmitted in this manner with a relatively compact low weight device.

Referring now to FIGS. 1 and 2, second housing 26 may be bolted to outer ring 76 by means of bolts 80 and may be supported relative to first housing 22 by means of bearings 82. In addition, second housing 26 is rotatably attached to shaft 42 by means of insert 84 such that second housing 26 may rotate relative to shaft 42 and first housing 22 under the influence of outer ring 76. Thus, as motor 30 causes rotor assembly 36, first drive member 62, and outer ring 76 to rotate, second housing 26 also rotates in the same direction but at a slower speed than motor 30. In this manner, second attachment mechanisms 28 can be rotated relative to first attachment mechanism 24 so as to be able to rotate an arm in a robotic system.

Figure 8:
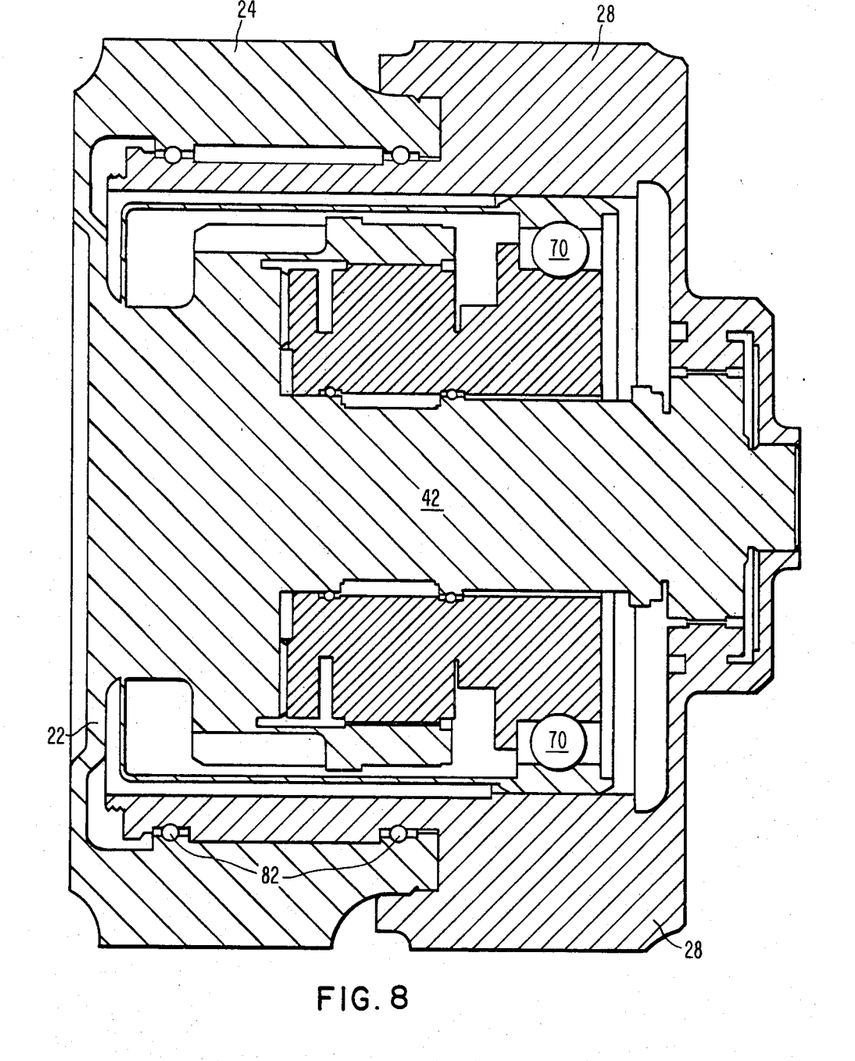
FIG. 8 is a schematic view of the movement of the components.

FIG. 8 illustrates the general movement of the components of electric actuator 20. As is evident in FIG. 8, first housing 22, deep cup harmonic drive member 32, stator windings 38, and stator assembly 40 may be considered stationary. Rotor winding 34, rotor assembly 36, coupling 50, first drive member 62, first flexible ring 66, and second flexible ring 68 all rotate about shaft 42 at one speed while outer ring 76 and second housing 26 rotate about shaft 42 and at a slower speed than rotor assembly 36.

Again referring to FIG. 2, a resolver assembly 90 is mounted in electric actuator 20 with a first portion 92 attached to second housing 26 and a second portion 94 mounted on shaft 42 and adjacent to first portion 92 for measuring the rotation of second housing 26 relative to shaft 42 and first housing 22. Resolver assembly 90 may be one procured from the Northern Precision Laboratories, Inc. of Fairfield, N.J.

Figure 9:
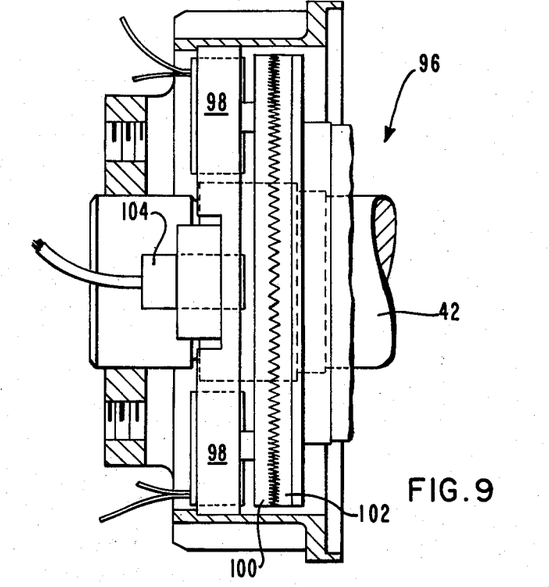
FIG. 9 is a view of the brake in the locked position.
Figure 10:
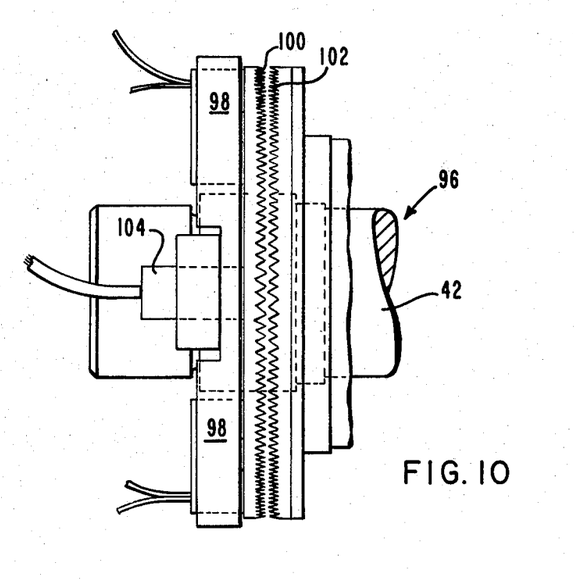
FIG. 10 is a view of the brake in the unlocked position.

Referring to FIGS. 2, 9 and 10, a brake/tachometer 96 which may be procured from Sperry Electro Components, Durham, N.C. may be disposed around shaft 42 and attached to stator assembly 40. Brake/tachometer 96 comprises a brake solenoid 98 with a plurality of first gear teeth 100 arranged to selectively engage second gear teeth 102 which are mounted on rotor assembly 36. When brake solenoid 98 is energized, first gear teeth 100 are disengaged from second gear teeth 102 as shown in FIG. 10 which allows rotor assembly 36 to rotate freely. However, when brake solenoid 98 is deenergized, first gear teeth 100 engage second gear teeth 102, thereby preventing rotation of rotor assembly 36. Brake solenoid 98 may have a capacity of 100 in-lb and a 10-watt disengaging power. Also, brake/tachometer 97 may be provided with an electromagnetic tachometer 104 for determining the speed of rotation of rotor assembly 36 relative to shaft 42 and first housing 22. Tachometer 104 may be a signal-type tachometer generating 240 pulses per revolution with a signal magnitude of 50 mV at 440 rpm.

There are numerous advantages that electric actuator 20 embodies that result in a high torque-to-weight electric actuator for robotic systems. The samarium-cobalt rare-earth motor 30 provides a high magnetic flux density, resulting in a high torque to weight ratio. The deep cup harmonic drive member 32 allows many of the components to be disposed therein which allows for a compact, lightweight design while providing for sufficient stiffness in the drive train. The brake/tachometer 96 allows motor 30 to be deenergized while preventing rotation of second housing 26 relative to first housing 22 thus holding the components of the robotic system in the desired relationship. Brake/tachometer 96 also provides a compact means for measuring the angular velocity of the electric actuator. Furthermore, the multiple usage of structural elements in electric actuator 20 allows the use of frameless components thus reducing the weight and the volume of the electric actuator.

Thus, an electric actuator of the type described herein can be built weighing approximately 20 pounds and being able to rotate approximately 170 lbs. at the end of a 3-foot arm thus developing approximately 6000 in/lb torque while being capable of greater than 360° of rotation.

Therefore, the invention provides an electric actuator having a high torque-to-weight ratio and capable of being used in an arm of a robotic system.

We claim as our invention:
1. An electric actuator comprising:
   a first housing;
   a stationary shaft disposed in and attached to said first housing;
   a cylindrical thin walled deep cup harmonic drive member partially disposed in and attached to said first housing and disposed around said shaft, said deep cup harmonic drive member having one closed end and one open end with a plurality of first teeth disposed around the outside circumference of said open end;

a stator assembly disposed in said deep cup harmonic drive member attached to said first housing and mounted on said shaft;

a rotor assembly rotatably disposed on said shaft and within said stator assembly with said stator assembly and said rotor assembly establishing an electromotive force for rotating said rotor assembly around said shaft;

a harmonic drive mechanism connected to said rotor assembly, disposed around said shaft, and disposed in said deep cup harmonic drive member and in contact with said deep cup harmonic drive member near said first teeth;

an outer ring having a set of second teeth along the inside circumference thereof and disposed around said deep cup harmonic drive member such that said second teeth are capable of contacting said first teeth thereby driving said outer ring around said shaft; and a second housing attached to said outer ring and rotatably connected to said shaft for being rotated relative to said first housing by said outer ring.

2. The electric actuator according to claim 1 wherein said electric actuator further comprises first bearing means mounted on said shaft and connected to said rotor assembly for rotatably supporting said rotor assembly.

3. The electric actuator according to claim 2 wherein said electric actuator further comprises second bearing means connected to said first housing and said second housing and disposed between said first housing and said deep cup harmonic drive member for rotatably supporting said second housing.

4. The electric actuator according to claim 3 wherein said electric actuator further comprises a resolver assembly disposed in and connected to said second housing and connected to said shaft for measuring the rotation of said second housing relative to said shaft.

5. The electric actuator according to claim 4 wherein said electric actuator further comprises brake means mounted on said stator assembly and disposed near said rotor assembly for selectively coupling said stator assembly to said rotor assembly thereby preventing relative movement therebetween.

6. The electric actuator according to claim 5 wherein said electric actuator further comprises rotating measurement means mounted on said stator assembly and near said rotor assembly for determining the angular speed of said rotor assembly relative to said stator assembly.

7. The electric actuator according to claim 6 wherein said electric actuator further comprises a coupling disposed around said shaft and connected to said rotor assembly and to said harmonic drive mechanism.

8. The electric actuator according to claim 7 wherein said stator assembly and said rotor assembly comprise a samarium-cobalt rare-earth magnet, frameless DC torque motor.

9. The electric actuator according to claim 8 wherein said brake means comprises:

a brake solenoid assembly having first gear teeth formed on the end thereof and arranged near said rotor assembly; and second gear teeth formed on an end of said rotor assembly and arranged to be selectively engaged with said first gear teeth under the action of said brake solenoid for preventing rotation of said rotor assembly relative to said stator assembly.

10. The electric actuator according to claim 9 wherein said rotating measurement means further comprises an electromagnetic tachometer mounted on said stator assembly near said rotor assembly for determining the relative angular speed of rotor assembly.

* * * * *